United States Patent [19]

Hayashi et al.

[11] 4,076,417

[45] Feb. 28, 1978

[54] INTERLOCKING APPARATUS FOR AN OPTICAL SYSTEM AND REPRODUCING MACHINE

[75] Inventors: Fujio Hayashi, Webster; Robert W. Corbin, Ontario, both of N.Y.

[73] Assignee: Xerox Corporation, Staamford, Conn.

[21] Appl. No.: 682,694

[22] Filed: May 3, 1976

[51] Int. Cl.[2] .................. G03B 27/70; H01H 9/20; H01H 33/46

[52] U.S. Cl. .................. 355/60; 200/50 R; 355/8; 355/14; 355/51; 355/66

[58] Field of Search .................. 355/60, 8, 11, 65, 66, 355/51, 57, 14; 200/50 R, 50 C

[56] References Cited

U.S. PATENT DOCUMENTS

| | | | |
|---|---|---|---|
| 3,182,196 | 5/1965 | Leishman | 250/66 |
| 3,233,052 | 2/1966 | Contal | 200/50 |
| 3,614,222 | 10/1971 | Post | 355/8 |
| 3,837,743 | 9/1974 | Amemiya | 355/60 |
| 3,877,804 | 4/1975 | Hoppner | 355/8 |
| 3,936,150 | 2/1976 | Ikeda | 355/60 X |
| 3,950,091 | 4/1976 | Brooke | 355/8 |
| 3,989,371 | 11/1976 | Valentine | 355/8 X |
| 3,990,792 | 11/1976 | Kono et al. | 355/8 |
| 4,011,012 | 3/1977 | Kawai | 355/55 |

*Primary Examiner*—Richard A. Wintercorn
*Attorney, Agent, or Firm*—James J. Ralabate; Clarence A. Green; Paul Weinstein

[57] ABSTRACT

An optical apparatus and reproducing machine includes an optical system for viewing a document and for projecting an image thereof onto a moving imaging surface. A plurality of optical elements are arranged along an optical path. The projected image magnification is changed by changing the position of at least two optical elements. An interlock apparatus associated with the magnification changing system is provided for inhibiting the change in position of one of the two optical elements until the other of the two optical elements has completed its change in position, upon the changing of the magnification of the optical system.

10 Claims, 8 Drawing Figures

INTERLOCKING APPARATUS FOR AN OPTICAL SYSTEM AND REPRODUCING MACHINE

BACKGROUND OF THE INVENTION

This invention relates to a multi-mode reproducing apparatus preferably of the electrostatographic type. The apparatus includes means for copying documents selectively at one of a plurality of magnifications.

An optical system is provided which is arranged to stripwise scan a stationary document in one mode of operation or to be beld fixed at a given position to stripwise view a moving document. Reduction copying is accomplished in this latter mode of operation. In order to accomplish reduction copying an optical element not part of the stripwise scanning system is inserted into the optical path of the optical system fixed at the given position. In accordance with this invention an apparatus is provided for preventing a premature rearrangement of the optical system before the added optical element has been removed from the optical path.

A variety of electrostatographic reproducing machines are commercially employed which have different modes of operation. One type of machine utilizes a moving original exposure system wherein an original document is moved past a fixed slit optical system for projecting an image onto the moving photoconductive surface. These machines include a means for changing the magnification of the projected image to provide reduction copies. Exemplary of patents in this area is U.S. Pat. Nos. 3,076,392, to Cerasani et al., and 3,649,114 to Vlach et al.

Other machines have been adapted to copy stationary original documents at a variety of magnifications or reductions through the use of a scanning optical system. Exemplary of patents in this area are U.S. Pat. Nos. 3,476,478, to Rees, Jr.; 3,542,467 to Furgeson; 3,614,222 to Post; and 3,837,743 to Amemiya. Another approach which has been utilized for projecting images for reproduction at varying magnifications from a stationary original comprises full frame exposure. Exemplary of patents in this area are U.S. Pat Nos. 3,543,289 to Koizumi; 3,687,544 to Muller; 3,703,334 to Knechtel; and German Offenlegungsschrift 2,154,944 to Libby.

U.S. Pat. Nos. 3,703,334 to Knechtel and 3,837,743 to Amemiya set forth above are also significant in that they disclose the use of a separate reflector or add reflectors, respectively, which are selectively positionable in the optical path for changing the conjugate distance of the optical system for providing varying magnifications.

The aforenoted machines are adapted to provide one or more modes of copying having different magnifications. In the optical systems of these machines, some means is usually provided for changing the conjugate relationship on the object and image sides of the projection lens. This may be accomplished by translating the lens between different positions for different projected image magnifications or in accordance with an alternative approach by utilizing more than one lens whereby different lenses are selectively positionable in the optical path, depending upon the projected image magnification desired. See, for example, U.S. Pat. No. 3,779,642 to Ogawa.

Other forms of multi-mode copiers are available commercially. For example, in the Xerox 3100 LDC machine an optical system is provided which enables the machine to copy from a stationary original in a first scanning mode or from a moving original in a second fixed optical mode. This latter mode is particularly adapted for copying documents larger than the conventional viewing platen size. U.S. Pat. No. 3,900,258 to Hoppner et al. [1] is illustrative of a machine similar in many respects to the 3100 LDC machine.

Reproducing apparatuses including the capability of making copies from both moving and stationary originals are also described in U.S. Pat. No. 3,833,296 to Vola, and in IBM Technical Disclosure Bulletin, Vol. 12, No. 1, at page 173, June 1969.

It has been found desirable, to provide a multi-mode reproducing apparatus having various unique features of the 3100 LDC machine, including its extremely compact size, but also having the capability of reduction copying.

One approach to such a machine is described in U.S. application Ser. No. 588,971, filed June 20, 1975 now U.S. Pat. No. 4,027,963, to Hoppner et al. [2]. In that application a multi-mode reproducing apparatus is provided including both moving and stationary original exposure modes, with at least two modes of moving original exposure at differing copy image magnifications. The Hoppner et al. [2] machine includes a first optical mode wherein a stationary document is viewed and an image thereof is projected onto a moving imaging surface. In a second mode a document moving at a first speed synchronized to the speed of the moving imaging surface is viewed and an image thereof projected onto the imaging surface at a desired magnification. In a third mode a document moving at a second speed synchronized to the speed of the moving imaging surface is viewed and an image thereof projected onto the surface at a reduced magnification. In the reduction mode of operation a scanning optical system is held fixed at a given position and an additional optical element comprising an add mirror is inserted into the optical path in order to change the conjugate on the object side of the lens. The lens is also shifted to a new position to align it with a repositioned optical path.

A variety of devices are known in the prior art for interlocking various functions of a reproducing machine. For example, interlock switches are utilized in conjunction with the covers of the machine to shutdown machine operation upon opening of the covers. A variety of failsafe mechanisms are found in the prior art which allow a machine to continue to complete a copying cycle even though the control system has received a premature mode changing signal.

The use of selectively added optical elements causes problems in changing modes of operation. Optical mode changing usually necessitates rearranging various of the optical elements. In the highly compact machine of this invention a prioritization of the mode changing movements of the optical elements is provided to prevent one element from crashing into another or otherwise interferring with its movement.

SUMMARY OF THE INVENTION

In accordance with this invention means are provided during optical mode changing for preventing the movement of one optical element of a multi-mode optical system until another optical element has been repositioned. Preferably a positively interlocking mechanical linkage is employed which senses the completed repositioning of the one elemnt and responsive thereto releases the other element for repositioning movement.

Therefore, in accordance with one embodiment of the present invention a reproducing apparatus is provided which includes a moving imaging surface, means for viewing a stationary document in a first mode of operation and for projecting an image thereof onto the imaging surface. Means for viewing a document moving at a first speed syncronized to the speed of the moving imaging surface in a second mode of operation and for projecting an image thereof onto the imaging surface at a desired magnification. The means for viewing a stationary document includes at least one scanning optical element arranged to stripwise scan the stationary document. The means for viewing the document moving at the first speed includes means for fixing the at least one optical element at a given position and means for inserting into the optical path between the document and the moving imaging surface at least one additional optical element operative in said second mode of operation. Interlock means are provided in accordance with the present invention for preventing the movement of the stripwise scanning optical element until the additional optical element is repositioned to an inoperative position.

Preferably, in accordance with the present invention, other modes of operation for the reproducing machine are also provided. Preferably, the interlock means comprises means for sensing the withdrawl of the additional optical element from the optical path and responsive thereto for releasing the scanning optical element so that it may scan a stationary document.

More preferably, the sensing and releasing means comprise a mechanical arrangement including a pivoting lever for sensing the position of said at least one additional optical element. A collapsable linkage associated with the means for fixing the scanning optical element at said given position and means operatively connected between the pivoting lever and the collapsable linkage. The linkage is collapsed when the additional optical element is not sensed to thereby retain said scanning optical element at said fixed position. The linkage is straightened out when said optical element is sensed to thereby release the scanning optical element for scanning operation.

Accordingly, it is an object of the present invention to provide an improved multi-mode reproducing apparatus.

It is a further object of this invention to provide an apparatus as above including selectively positionable optical elements which are rearranged to change modes.

It is a still further object of this invention to provide an apparatus as above including an interlock means for prioritizing the mode changing movement of the optical elements during rearrangement.

These and other objects will become more apparent from the following description and drawings.

DETAILED DESCRIPTION OF THE PREFERRED EMBODIMENTS

In the background of this invention there has been set out a number of patents dealing with reproducing apparatuses adapted to function in one or more modes of operation. Some of the apparatuses are capable of imaging from a moving or a stationary document and some of the apparatuses are capable of making copies in a variety of selected magnifications including reductions.

When one attempts to combine these modes of operation in a single reproducing apparatus of a fairly compact nature significant problems arise because of the necessity in a reduction mode of operation to change the conjugate on the object or image side of the lens.

In accordance with the present invention a multimode reproducing apparatus is provided having an extremely compact optical system which provides both moving and stationary original exposure and the associated advantages of each, as well as at least one mode of reduction by moving original exposure. The apparatus which will be described preferably features a unique optical system which enables the overall combination of modes of operation. The preferred optical system includes an add mirror for forming a reflection cavity with one of the other reflectors in the optical system to provide an increased conjugate.

As above-noted the use of selectively added optical elements causes problems in changing modes of operation. Changing optical modes usually necessitates rearranging various of the optical elements. In the highly compact machine of this invention a prioritization of the mode changing movements of the optical elements is provided to prevent one element from crashing into another or otherwise interferring with its movement. This is accomplished in accordance with this invention by providing a means for preventing the movement of one element until the other has been repositioned. Preferably, a positively interlocking mechanical linkage is employed which senses the completed repositioning of the one element and responsive thereto releases the other element for repositioning movement.

In order to properly describe such an apparatus a description of a reproducing machine with which it can be employed follows.

Figure 1:
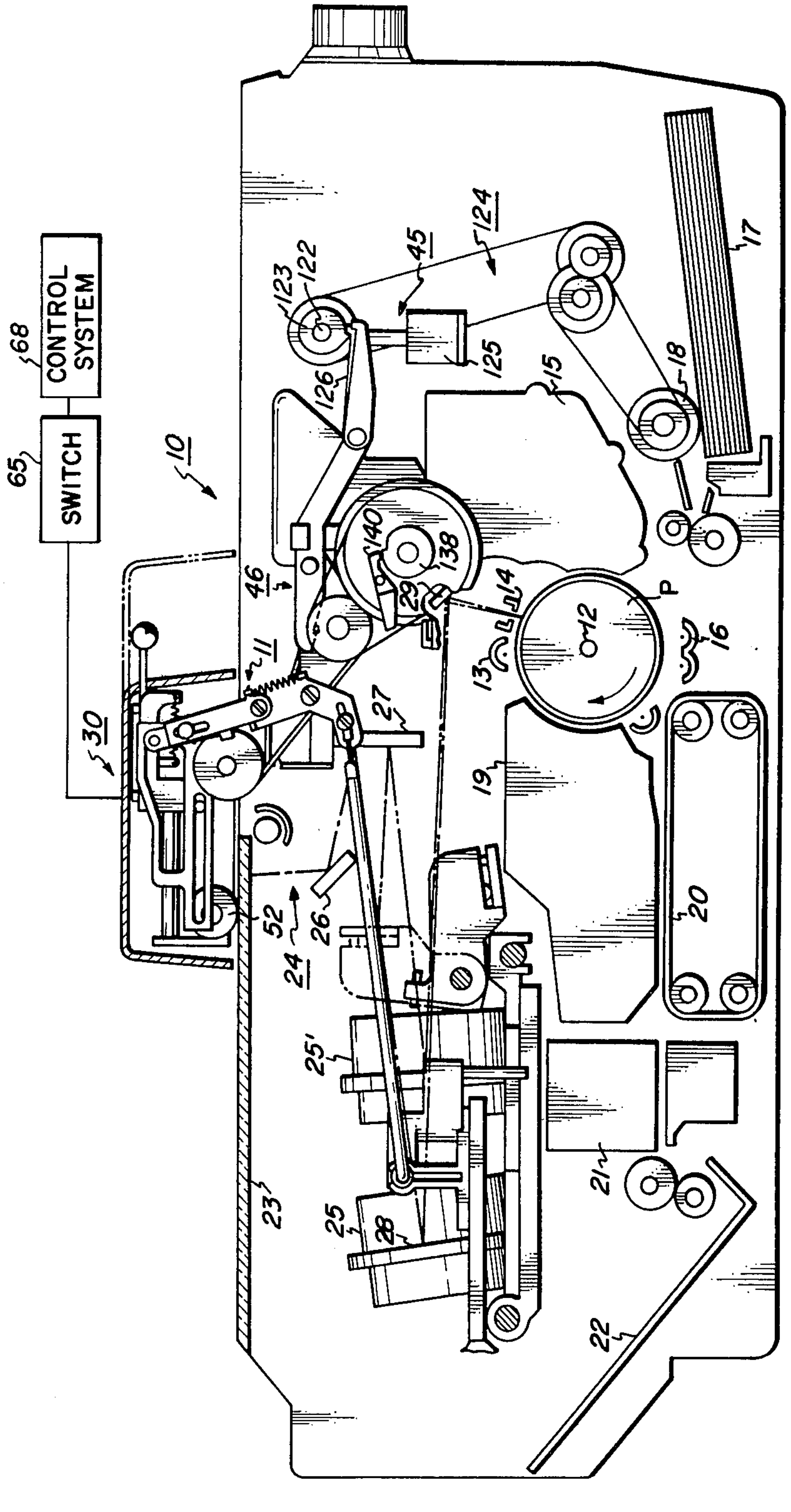
FIG. 1 is a schematic front view of a reproducing apparatus in accordance with one embodiment of the present invention.

Referring now to FIG. 1, there is shown by way of example an electrostatographic reproducing machine 10 which incorporates the interlocking apparatus 11 of the present invention. The reproducing machine 10 depicted in FIG. 1 illustrates the various components utilized therein for xerographically producing copies from an original. Although the apparatus of the present invention is particularly well adapted for use in an automatic xerographic reproducing machine 10, it should become evident from the following description that it is equally well suited for use in a wide variety of electrostatographic systems and is not necessarily limited in its application to the particular embodiment shown herein.

Basically, the xerographic processor includes a rotatably mounted photoconductive drum P which is supported upon a horizontally extended shaft 12. The drum is driven in the direction indicated whereby its photoconductive surface is caused to pass sequentially through a series of xerographic processing stations.

The practice of xerography is well-known in the art, and is the subject of numerous patents and texts, including *Electrophotography* by Schaffert, published in 1965, and *Xerography and Related Processes*, by Dessauer and Clark, published in 1965. Therefore, the various processing steps involved will be briefly explained below in reference to FIG. 1. Initially, the photoconductive drum surface is uniformly charged by means of a corona generator 13 positioned within a charging station located at approximately the 12 o'clock drum position. The charged drum surface is then advanced into an imaging station 14 wherein a flowing light image of an original document to be reproduced is projected onto the charged drum surface thus recording on the drum a latent electrostatic image containing the original input scene information. Next, subsequent to the exposure step in the direction of drum rotation is a developing station 15 wherein the latent electrostatic image is rendered visible by applying an electroscopic marking powder (toner) to the photoreceptor surface in a manner well known and used in the art. The now visible image is then forwarded into a transfer station 16 wherein a sheet of final support material is brought into overlying moving contact with the toner image and the image transferred from the plate to the support sheet by means of a second corona generator 16.

In operation, a supply of cut sheets are supported within the machine by means of a paper cassette 17. A pair of feed rollers 18 are arranged to operatively engage the uppermost sheet in the cassette so as to first separate the top sheet from the remainder of the stack and then advance the sheet into the transfer station in synchronous moving relationship to the developed image on the photoconductive plate surface. The motion of the feed rollers is coordinated with that of the rotating drum surface, as well as the other machine components through the main drive system whereby the support sheet is introduced into the transfer station in proper registration with the developed toner image supported on the xerographic plate. For further information concerning this type of sheet feeding mechanism, reference may be had to U.S. Pat. No. 3,731,915 to Guenther.

After transfer, but prior to the reintroduction of the imaged portion of the drum into the charging station, the plate surface is passed through a cleaning station 19 wherein the residual toner remaining on the plate surface is removed. The removed toner particles are collected within a container where they are stored subject to periodic removal from the machine.

Upon completion of the image transfer operation, the toner bearing support sheet is stripped from the drum surface and placed upon a moving vacuum transport 20 which serves to advance the support sheet into a thermal fusing station 21 wherein the toner image is permanently fixed to the sheet. The copy sheet with the fused image thereon is forwarded from the fuser into a collecting tray 22 where the sheet is held until such time as the operation has occasion to remove it from the machine.

Normally, when the copier is operated in a conventional mode, the original document to be reproduced is placed image side down upon a horizontal transparent viewing platen 23 and the stationary original then scanned by means of the moving optical system 24. The scanning system 24 fundamentally consists of a lens 25 or 25' positioned below the right hand margin of the platen as viewed in FIG. 1, and a pair of cooperating movable scanning mirrors 26 and 27. The lens is basically a half-lens objective having a reflecting surface 28 at the stop position to simulate a full lens system. The two mirrors are slidably supported between a pair of parallel horizontally aligned guide rails (not shown). For a further description and greater details concerning this type of optical scanning system reference is had to U.S. Pat. No. 3,832,057 to Shogren.

In practice, mirror 26, herein referred to as the full rate scan mirror, is caused to move from a home position, directly below the left hand margin of the platen to an end of scan position below the opposite margin of the platen. The rate of travel of the scan mirror is synchronized to the peripheral speed of the rotating xerographic drum surface P. The second mirror 27 is simultaneously caused to move in the same direction as the scanning mirror at half the scanning rate. As the two mirrors sweep across the platen surface, an image of each incremental area thereon viewed by the scanning mirror is reflected towards the second mirror which, in turn, redirects the image back to the half lens system. The reflecting surface, positioned at the lens stop position, reverses the entering light rays and redirects the light rays back towards a stationary mirror 29 positioned directly above the drum surface at the exposure station 14. In this manner a flowing light image containing the original input scene information is focused upon the charged photoconductive plate.

A wind up spring (not shown) is provided to restore the moving mirrors to a start of scan condition.

The copying apparatus 10 shown in FIG. 1 is provided with a document feeder 30. The document feeder 30 is movable between a first stored position adjacent to the viewing platen 23 and a second operative position over the platen surface. Commensurate with the positioning of the feeder assembly over the platen, the moving optical system 24 is locked in a position to view documents as they are advanced by the document feeder over the platen and record a flowing light image of the input information upon the moving photoconductive plate surface P.

Figure 2:
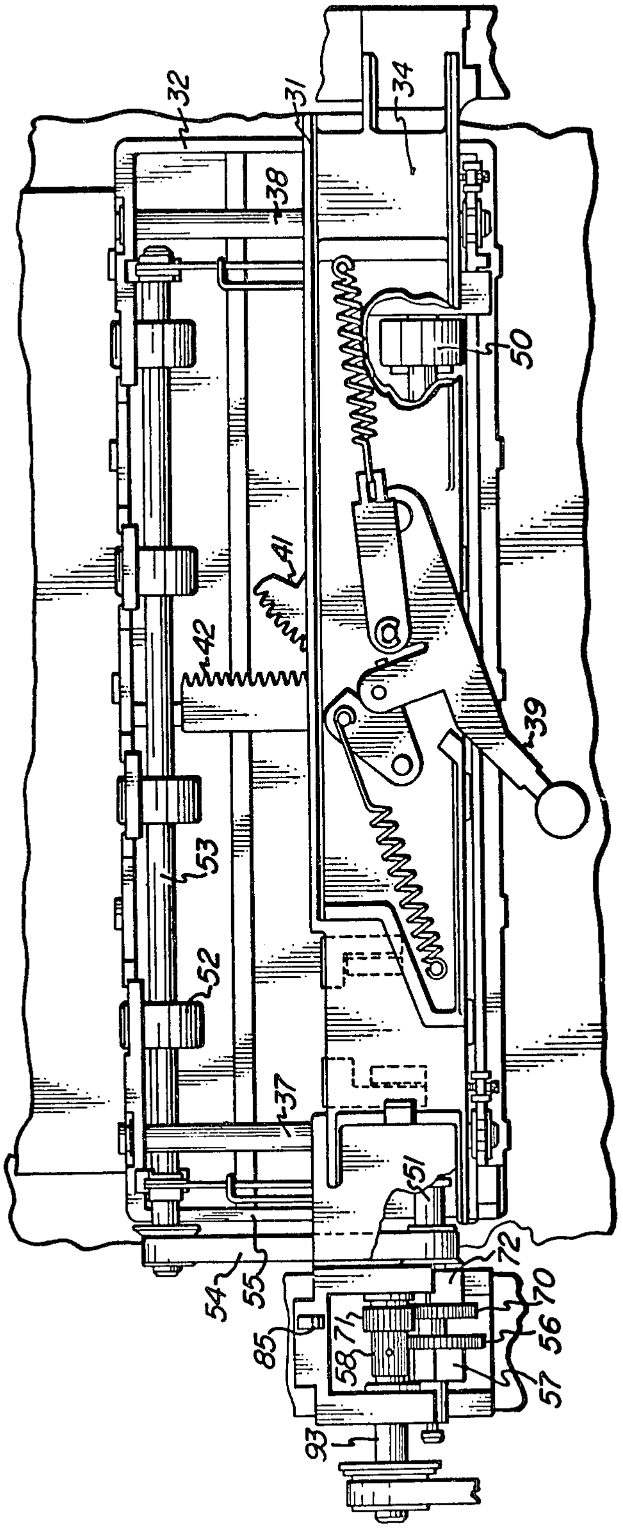
FIG. 2 is a partial top view of the apparatus of FIG. 1 showing the document feeder with the cover removed.
Figure 3:
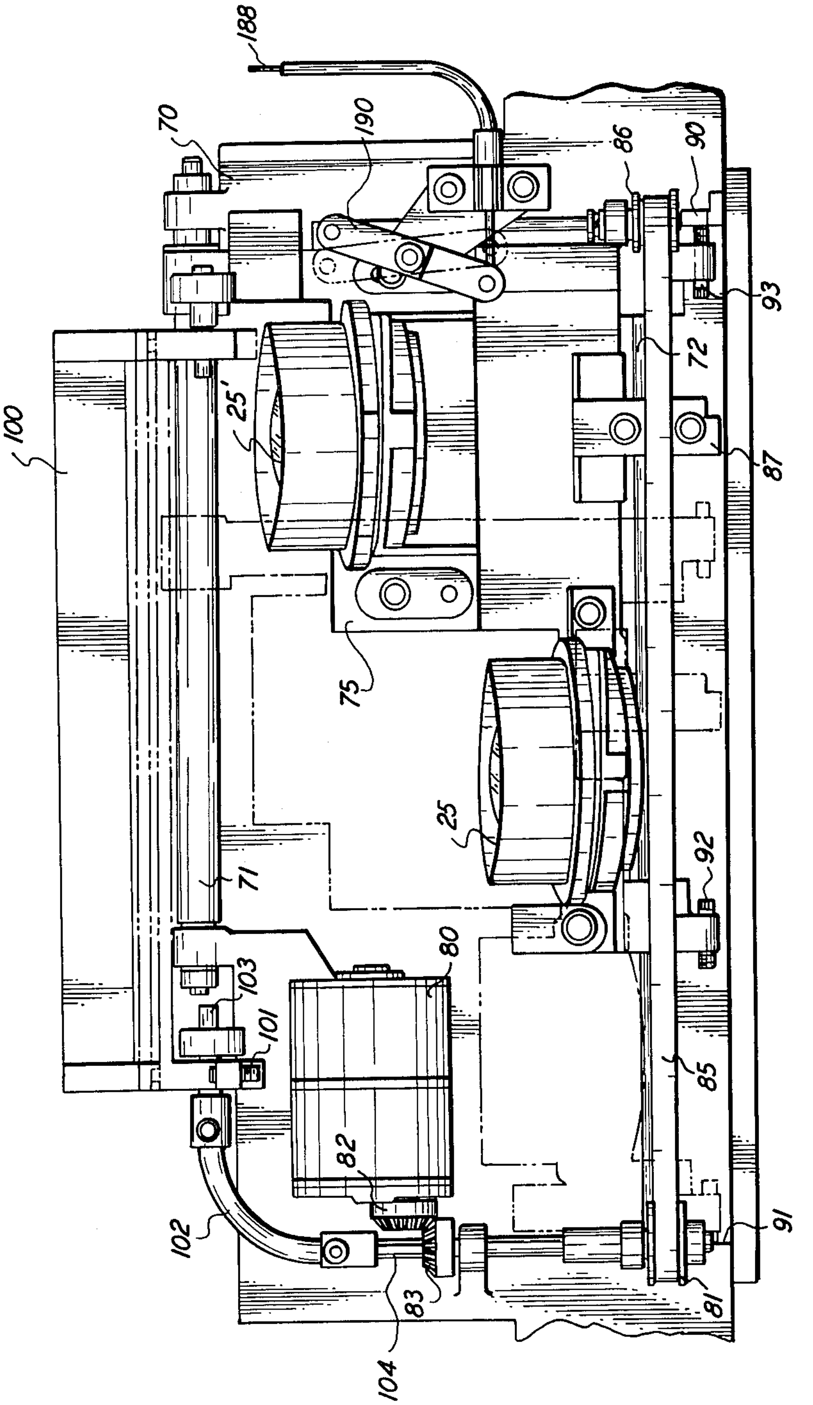
FIG. 3 is a partial top view showing the magnification changing apparatus for the optical system of the reproducing apparatus.

Referring now more specifically to FIGS. 1 and 2, there is shown the document feeding mechanism 30 associated with the instant invention. During normal operations, that is, when the moving optics are utilized to provide a flowing light image of the stationary original, the document feeding assembly is maintained in a stored position (as depicted by the phantom lines shown in FIG. 1) to expose the entire platen surface area and thus provide a maximum working area for the operator.

To initiate the moving document mode of operation, the machine operator simply advances the document feeding assembly 30 from the stored position to a document feeding position with the feeding assembly extending over the left hand margin of the platen surface. Fundamentally, the document feeding mechanism is made up of two main sections which include a stationary support bridge, generally referenced 31, and a movable feed roller support section, generally referenced 32. The bridge 31 is made up of two vertically extending end support members which are securely anchored in the machine frame and upon which is secured a horizontal span 34. The feed roller support section 32 is slidably suspended from the horizontally extended span 34 by means of a pair of parallel aligned rod-like guide rails 37 and 38 which are slidably supported in bearings (not shown) affixed to the underside of the bridge span. The document feed roll assembly is thus suspended from the span so that it can be freely moved back and forth from the home or stored position adjacenr to the platen 23 and an extended position over the left hand margin of the platen surface.

In practice, at the start of the moving document handling conversion cycle, the machine operator grasps a lever arm 39 mounted on top of the bridge span and rotates the arm in a clockwise direction as shown in FIG. 2. The lever arm is operatively connected to segmented pinion 41 which meshes with a rack 42 secured to the feed roller assembly 32. Movement of the arm in a clockwise direction causes the movable feed roller assembly to be advanced toward the fully extended or operative position. Rotation of the arm in the opposite direction produces the opposite result.

Manually moving the feed roller support assembly 32 to the extended position also physically closes the contacts of a large document mode switch (not shown) causing a signal to be sent to the main machine drive motor (not shown) actuating the motor. At the same time, a signal is also sent to the machine logic control system placing the machine in a single copy mode of operation. This latter step is required in order to move the optical system from its normal rest position, which is the start of scan position at the left hand end of the platen surface, to the end of scan position beneath the now fully extended feed roll assembly. However, during this initial conversion phase, no original is actually being processed and there is, therefore, no need to feed copy sheets through the copier. In point of fact, feeding a copy sheet during the conversion phase would have a deleterious effect on the various machine components as well as confusing the machine programming and registering system. To prevent this occurrence, feed inhibiting means 45, as shown in FIG. 1, are provided for inhibiting the action of the paper feeder during the period when the machine is being converted to the moving document mode of operation. Means 46 are provided for locking the optics at the end of scan position during the moving original mode of operation. Means 46 comprise a lock-out mechanism which serves to both uncouple the optics drive shaft from the main drive system and hold the optics rigidly in a fixed position for viewing moving documents subsequently advanced through the document feeding assembly 30.

Further details of the lock-out means 45 will be presented later. An alternative feed inhibitor means and lock-out means which could be employed are described in U.S. Pat. No. 3,877,804 to Hoppner.

The movable document feed roller support section 32 of the document feeder assembly is provided with two sets of co-axially aligned rollers comprising a first set of drive rollers 50 mounted upon shaft 51 and a second set of hold down drive rollers 52 mounted upon shaft 53. The two roller support shafts are connected by means of a timing belt 54 whereby each set of rollers is adapted to turn in coordination with the other set of rollers. Shaft 51 is arranged to extend beyond the end wall 55 of the movable document feeder roll support section 32 and has a gear 56 rotatably supported thereabout by normally engaged wrap spring clutch 57. In operation gear 56 is adapted to move into and out of meshing contact with the stationary driven gear 58 as the document feed roll section is moved between its stored and fully extended position. When placed in a fully extended position, as shown in FIG. 2, the gear 56 meshes with gear 58 thus causing both the document feed rollers 50 and the hold down rollers 52 to be rotated. Directly below the stationary bridge and adjacent to the platen margin are a set of pinch rollers 59 (not shown) which are rotatably supported in the machine frame. The pinch rollers are arranged in the machine frame so as to coact with the feed rollers 50 when the document feeder 30 is in the operative position so as to advance a document introduced therebetween. In operation, the document is moved past the viewing domain of the now fixed optical assembly 24 and then into the pinch between the hold down rollers 52 and the platen 23 surface. The hold down rollers 52 serve to hold the document in sliding contact with the platen surface as the original is being moved past the optics and to feed the document after it leaves the pinch of rolls 50 and 59.

The rolls 50 and 52 in the feeder 11 shown are continuously driven during machine operation even when no sheet is being fed.

The machine which has been discussed thus far is similar in many respects to the aforenoted Xerox 3100 LDC copier. It is capable of operating in a number of modes including a scanning mode wherein a stationary original is scanned by the moving optical system 24 as well as a moving original mode wherein the original itself is moved in synchronism with the peripheral velocity of the drum and the optical system is held stationary. This latter approach is useful only in a single copy mode in the apparatus described; however, it facilitates the copying of originals having a size larger than the platen.

In accordance with the present invention yet another mode of operation may be provided for a reproducing machine. This additional mode of operation comprises a reduction mode wherein the image on the original is reduced in size by the optical system for projection onto the photosensitive surface whereby the image which is transferred to the sheet of final support material is similarly reduced in size. In accordance with the reproducing machine of this invention, the reduction mode is accomplished by a moving original exposure system.

For the reduction mode of operation it is necessary to operatively position alternative lens 25' to change the conjugate distance between the lens and the object or image planes. Further, it is necessary to advance the document past the fixed optics 24 at a velocity greater than the peripheral velocity of the drum P.

In accordance with a preferred embodiment of the present invention, the previously noted optical system of the Shogren patent is modified to provide for an alternative lens 25' which is translated to an operative position as lens 25 is translated to a stored position and for the insertion of an add mirror 60 into the optical path to change the platen 23 to lens conjugate. The optical system which is utilized herein is similar in many respects to that described in application Ser. No. 588,974, filed June 20, 1975 now U.S. Pat. No. 4,049,409, to Spinelli et al. The optical system of this embodiment provides in addition to the optical system of the Shogren patent an add reflector 60 which is selectively positionable into the optical path to combine with the half rate mirror 27 to form a reflection cavity and increase the object distance for magnification change. The alternative lens 25' is positioned relative to the optical path to adjust the conjugate distance. Of course, by the nature of a half (Catadioptric) lens 25 with its associated reflector 28 the optical path incident to the lens and reflected back through the lens is at some angle relative to the lens axis. Therefore, a magnification change necessitates repositioning of the original lens 25 or positioning an alternative lens to take into account the divergence of the lens axis and optical path. The insertion of the add reflector 60 displaces the optical path 61 to 61' and, therefore, the lens 25' with its lens reflector 28 is positioned to satisfy conjugate distance requirements and to be centered on the optical (principal ray) path 61'.

It is a unique feature of this optical system that the add mirror 60 does not form part of the scanning optical arrangement so that no adjustment is necessitated in the drives for the scanning mirrors irrespective of which magnification mode is selected. The provision of an add mirror 60 independent of the scanning optical system, which may be positioned in and out of the optical ray path of the scanning optical system provides a further advantage by reducing the mass of the scanning mirror assembly as compared with the prior art.

In order to obtain varying projected image magnifications by moving original exposure, it is necessary to advance the document past the optical viewing system at a velocity which varies depending upon the magnification which is selected. Various drive mechanisms are known which would enable the document feeder 30 to be driven selectively at one of a plurality of desired speeds corresponding to the given magnifications or minification selections. See, for example, those described in the Hoppner et al. [2] application and in U.S. Pat. No. 3,320,275 to Hewes et al.

The magnification changing mechanism 11 in accordance with the present invention includes a second lens 25' which is arranged for movement between a first stored position where it is inoperative and a second position where it is operative to project an image of the document onto the photosensitive surface P at a projected image magnification different than that provided by the lens 25. In its operative position the lens 25' is positioned forward of and laterally of the lens 25. It is necessary when employing the mode of operation utilizing lens 25 to store lens 25' at a position wherein it is outside the field of the optical ray path 61.

Commensurate with the positioning of the second lens 25' in its operative position an add reflector 60 is inserted in the optical ray path 61 to redirect it to 61' and to form a reflection cavity which the half-rate mirror 27 in order to change the conjugate relationship on the object side of the lens. The first lens 25 is translated out of the field of the optical ray path 61' so that it is inoperative when the lens 25' and add mirror 60 are operatively positioned.

A means for conditioning the apparatus 10 for moving original exposure has already been described. To condition the apparatus 10 for moving original exposure at a desired projected image magnification, a switch 65 as in FIG. 1 is provided to appropriately signal the machine control system 68 to condition the apparatus 10 in the first mode of moving original exposure which employs the stationary lens 25 and the fixed scanning mirrors 26 and 27 in accordance with the 3100 LDC approach or in the alternative mode of moving original exposure wherein lens 25' is translated from its stored position to its operative position and the lens 25 is translated to its stored position. The add mirror is pivoted from its stored position (shown in solid lines) out of the optical path 61 to its operative position (shown in phantom). The machine control system does not form part of the present invention and any desired system could be employed.

Referring now to FIGS. 1-4, the magnification changing mechanism 11 in accordance with the present invention will be described in greater detail. The magnification changing mechanism 11 in accordance with a preferred embodiment includes a frame 70. A pair of parallel spaced apart guide rails 71 and 72 are rigidly supported in the frame and a lens carriage 75 supporting lenses 25 and 25' is slidingly supported upon the guide rails for movement between the base mode position shown in solid lines wherein the lens 25 is positioned in the optical ray path 61 and the reduction position as outlined in phantom in FIG. 3 wherein the lens 25' is positioned in the optical ray path 61'. Each lens 25 or 25' in its stored or inoperative position is positioned outside the domain of the operative optical ray path 61 or 61'.

Each lens orientation is controlled by the way in which it is positioned on the lens carriage 75. Therefore, if it is desired to tilt the second lens 25' as compared to the orientation of the first lens 25 to avoid vignetting as in the aforenoted Hoppner et al [2] application, the second lens is supported in the tilted orientation on the lens carriage. Similarly, the position of the lenses vertically upwardly or downwardly and laterally of the machine may be set as desired by appropriately positioning the lenses on the lens carriage 75 and by appropriately controlling the lateral movement of the lens carriage.

A substantial advantage of this apparatus 11 over other approaches is the fact that the lateral displacement of the lenses 25 and 25' in a generally horizontal direction may be set as desired in order to obtain any desired copy image registration position on the resulting copy sheet and can be easily changed. The use of a two lens arrangement as in this invention offers great flexibility in adjusting the copy image registration on the copy sheet. Some adjustment of conjugate can also be obtained by adjusting the position of the lens on the lens carriage longitudinally of the optical path. The use of two lenses also allows the focal length to be varied between the lenses to provide additional flexibility for magnification change. The use of two lenses 25 and 25' of the same focal length is preferred, however, in view of the economy associated with such commonality.

The lens carriage 75 is driven by a motor 80. The motor 80 imparts motion to the lens carriage drive pulley 81 by means of the bevel gears 82 and 83. The drive pulley 81 is operatively connected to the lens carriage 75 by means of a timing belt 85 which is supported about the drive pulley at one side and about an idler pulley 86 at the other side. The timing belt is connected to the carriage 75 by means of a cantilever spring and clamp arrangement 87 so that the carriage 75 may be over-driven against stops 90 and 91 which are arranged at the respective end of travel positions. Carriage supported adjustable set screws 92 and 93 which act against the stops 90 and 91 are provided to adjust the operative positions of the carriage for base mode and reduction copying.

Upon selection of a desired mode of moving original exposure by means of a selector switch 65 if the lens carriage 75 is not already positioned in the desired position for that mode the carriage is translated until it engages the opposing stop member. Upon engaging the stop member the carriage is held at the desired position and a limit switch (not shown) is actuated, which by means of any desired circuitry serves to stop the motor 80 after a desired interval of over-drive so that the carriage is sufficiently biased against the stop so that the lenses will not be subject to shifting during operation which could adversely affect image quality. Similarly, when the alternate magnification mode of exposure is selected, the lens carriage 75 is translated in the opposing direction until it reaches the opposing stop member. Upon engaging the opposing stop member it actuates the opposing limit switch (not shown) which serves to stop the motor after a predetermined interval of over-drive. The cantilever spring and clamp arrangement allows the drive pulley 81 to continue to rotate and slightly advance the timing belt even though the carriage 75 has stopped.

The add mirror 60 is mounted on a pivoting carriage 100. The carriage is shown in its inoperative position in solid lines and in its operative position in phantom. An adjustable stop 101 is provided for accurately controlling the position of the add mirror when the carriage is in its operative position. The add mirror 60 is driven to its operative position or vice versa simultaneously with the positioning of the lens carriage. A flexible drive coupling 102 is secured at one end to a shaft 103 pinned to mirror carriage 100 and journaled in frame 70. The other end of the coupling 102 is secured to the shaft 104 supporting bevel gear 83. The flexible coupling may comprise a torsion spring wrapped about an inner cable or reverse wound torsion spring. The coupling 102 allows the mirror to be over-driven against the stop 101 so that it is biased in its operative position.

The drive arrangement described allows a single drive motor 80 to advance both the lens carriage 75 and the mirror carriage 100 between their respective operating positions. Since both elements are driven simultaneously the position of either the lens carriage or the mirror carriage can be utilized to sense the position of the other elements.

The interlocking mechanism is tied into the lockout apparatus 46 of the machine, which is similar in most respects to the lock-out system utilized in the 3100 LDC machine. The particular lock-out mechanism 46 to be described differs to some extent from that described in the Hoppner et al. [1] patent in that some simplification has been made to reduce the number of levers in the linkage and eliminate one of the solenoids originally employed.

The drives of the machine are powered from the main drive-motor through gear 120. Drives for the paper feeder are taken from the main drive 120 meshing with gear 121 supported about shaft 122 by means of wrap spring clutch 123. As shown in FIG. 1, a paper feed drive system 124 including appropriate chains and sprockets are utilized to impart drive from shaft 122 to the paper feed roll 18. A solenoid 125 and pivoting lever I are employed for controlling the operation of the paper feeder during normal machine operation. Paper feeding is controlled by actuation and deactuation of the solenoid by the machine control system at an appropriately timed interval in the copying cycle. The lever I is shown in FIGS. 1 and 5 in a position engaging the detent on the clutch collar to disengage the clutch and thereby the drives from the paper feeder.

Figure 5:
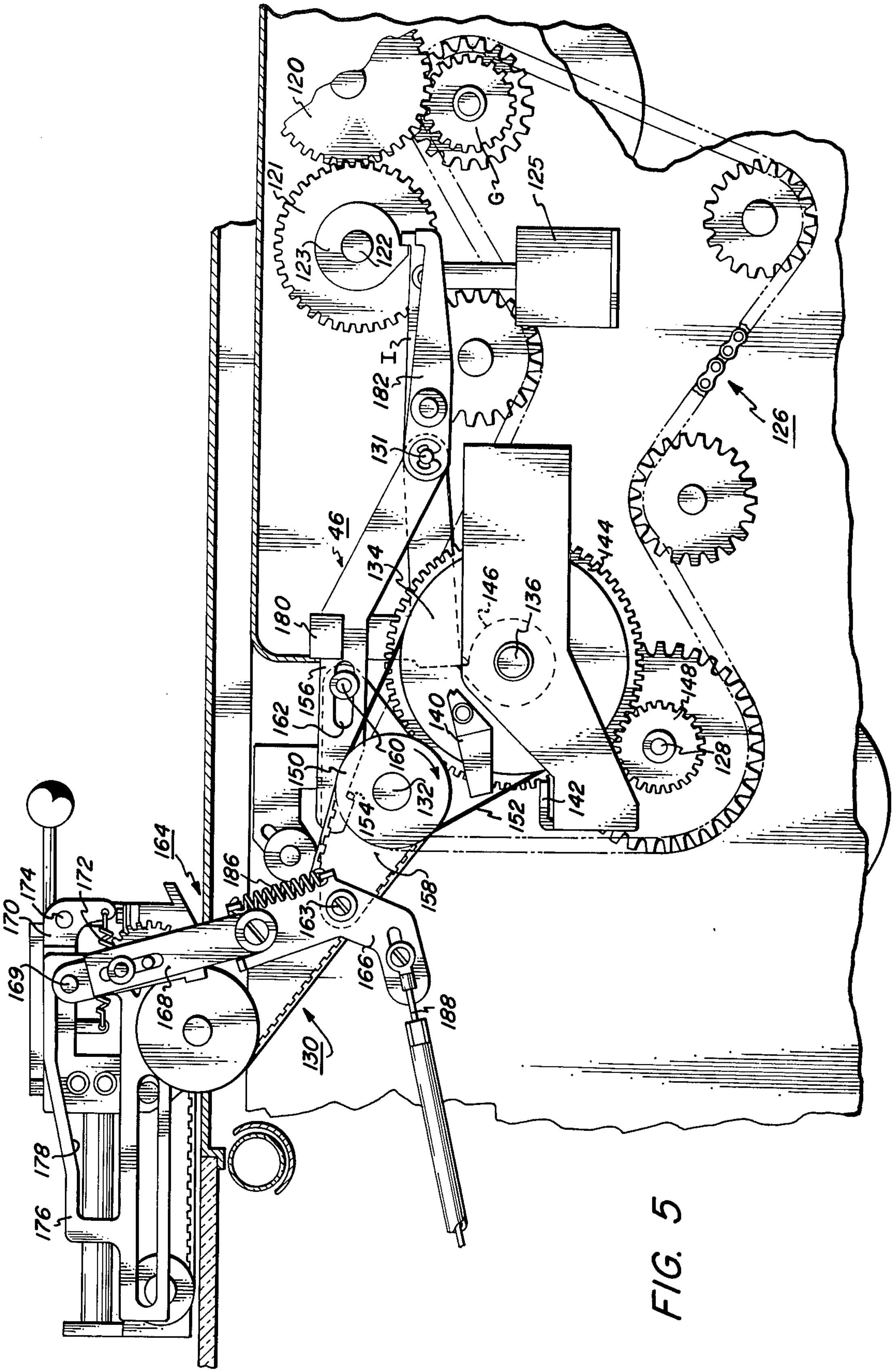
FIG. 5 is a partial front view of the apparatus of FIG. 1 providing a more detailed representation of the drives and interlock system of this invention.
Figure 6:
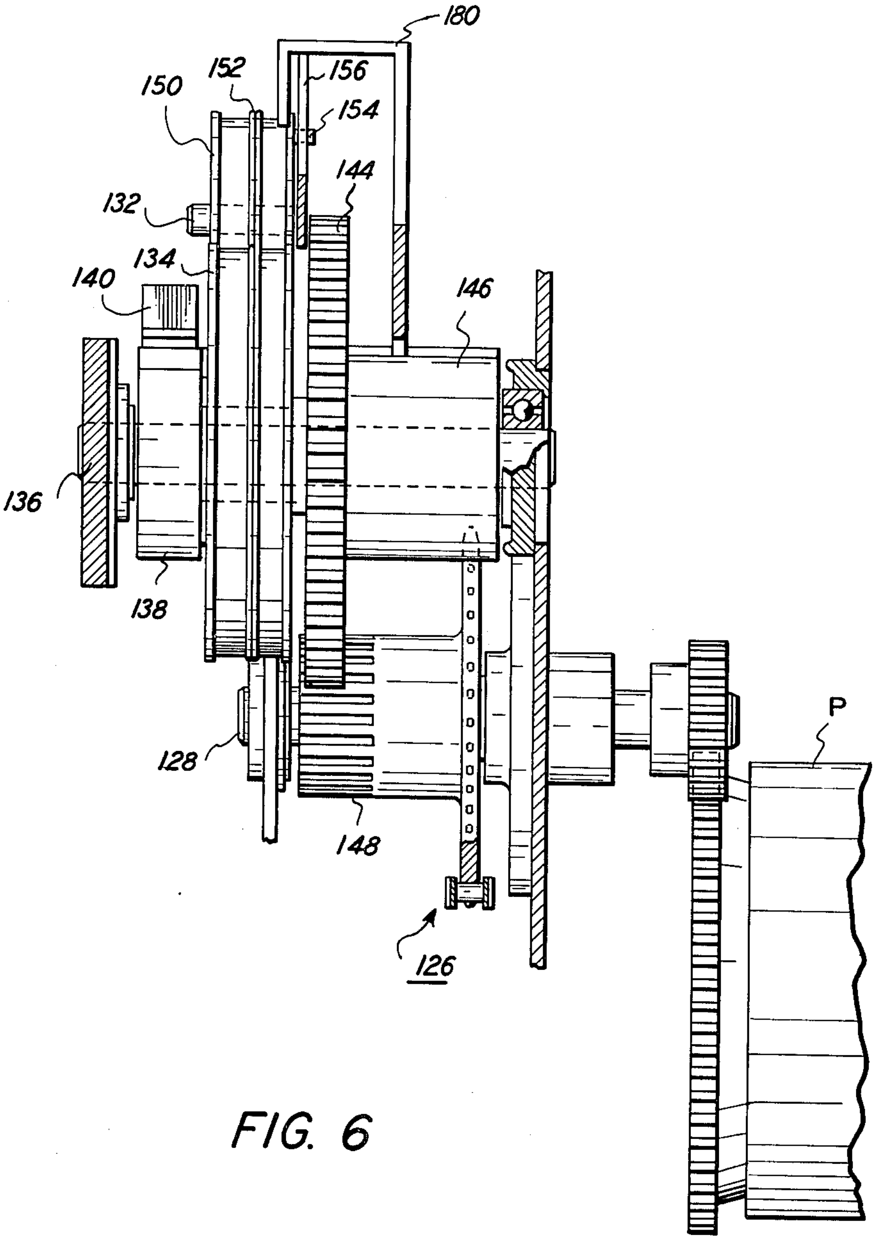
FIG. 6 is a partial side view of the drives apparatus of FIG. 5 as viewed from right to left.

Reference will now be had to the drives for the optical system and document feeder using FIGS. 1, 5, and 6. Those systems are connected to the main drive gear 120 through gear G and the main drive chain and sprockets 126. The photoreceptor drum P is driven off the main drive chain via the shaft 128. The drives to the document feeder rolls are provided by a timing belt and pulley arrangement 130. The timing belt is continuously driven off the main drive chain 126 via a combination sprocket and lower belt pulley (not shown) which idle on optics drive shaft 132. It is apparent, therefore, that the rotational speed of the rolls 50 and 52 is coordinated to the rotational speed of the drum P and synchronized therewith by means of the common drive chain arrangement 126. The document feeder rolls are, of course, only driven when the document feeder 30 is in its operative position over the platen 23. When it is in its stored position, the gears 56 and 58 are separated so that no drive is imparted to the rolls.

Drive input to the scanning optical system 24 is imparted by means of a scan drive pulley 134 rotatably supported about shaft 136. The scan drive pulley for scanning operation is selectively drivingly engaged to the shaft 136 by means of a drive collar 138 and pawl 140 arrangement as in FIG. 1. A lip 142 associated with the machine frame, as in FIG. 5, is arranged to disengage the scan pawl from the scan collar to allow the optics to fly-back. Scanning drive shaft 136 is driven by means of gear 144 which is mounted thereon through clutch 146. Gear 144 meshes with a gear 148 pinned to shaft 128 to provide a synchronized drive from the main drive chain 126. Shaft 136 is disengaged from the drives when appropriate by means of an extension (not shown) of solenoid operated lever I which engages the detent of clutch 146 when the lever is in the position as shown in FIG. 5.

Therefore, to provide paper feeding and scanning of the optical system the solenoid 125 would move the lever I clockwise about its pivot to allow the clutches 123 and 146 to engage the gears 121 and 144 to their respective shafts 122 and 136.

Further details of the scanning drive system can be obtained by reference to the above-noted Shogren patent The scan drive pulley 134 is connected to the optics drive shaft 132 by an optics pulley 150 pinned to that shaft and a cable 152 wrapped about both the scan drive pulley 134 and the optics scan pulley 150. When the mirrors 26 and 27 are moving toward their end of scan position, the optics scan pulley is moving in the direction of the arrow in FIG. 5.

The optics scan pulley includes a pin 154 which is arranged to be engaged by a lock-out lever 156 which locks the mirrors 26 and 27 at their end of scan position. Actuation of the lock-out lever 156 is provided by means of a pivoting plate 158 which is pivoted about the optics drive shaft 132. One end of the plate 158 includes a pin 160 which is arranged to ride in a slot 162 in the lock-out lever. The other end of the plate is pivotally secured by screw 162 to a document feeder connecting linkage 164. The connecting linkage 164 includes a first pivoting link 166 arranged to be pivoted about the screw 163. A second adjustable length link 168 is pivotally secured to the pivoting link 166 at one end and pivotally secured at its other end by a follower pin 169 to an "L" shaped biasing link 170. The link 170 is biased by spring 172 to bias the linkage 164 in an upwardly direction. The biasing link 170 is pivotally supported about pin 174 which is secured to the stationary bridge 31 of the document feeder 30.

A plate-like cam 176 is secured to the moving carriage 32 of the document feeder 30. The top surface 178 of the slot in the cam comprises the cam surface and it is arranged to be engaged by the follower pin 169 which is biased thereagainst. The linkage 164 is thereby moved upwardly and downwardly by the action of the cam surface 178 against follower pin 169 as the movable carriage 32 moves on and off the platen 23. This controls the actuation of the lock-out lever.

When the document feeder 30 is in its operative position over the platen 23 and the machine 10 is conditioned for moving original exposure, it is not desired to continue to drive the scan drive pulley 134. Therefore, an auxiliary scan drive disengagement lever 180 is provided which pivots about pin 131 so as to engage the detent collar on clutch 146 and disengage it during moving original exposure copy cycles. Actuation of the lever 180 is keyed to actuation of the scan lock-out lever 156 by means of a U-shaped top portion of the lever 150 which hooks over the scan lock-out lever. The scan drive disengagement lever 180 is arranged to pivot by gravity in and out of engagement with the clutch 146 depending on the position of the scan lock-out lever 156.

During the mode conversion cycle, that is, when the document feeder 30 is first placed over the platen 23, the machine operates as if a copy is being made so that the scanning mirrors 26 and 27 will scan to their end of scan position. During this period, however, it is not desired to feed a sheet of paper. The lever I and solenoid actuator 125 are not affected during the conversion cycle to lock-out the paper feeder because they behave as if a copy is actually being made. Therefore, an auxiliary lever 182 is employed which is actuated during the conversion cycle to inhibit the paper feeder by disengaging the clutch 123. The auxillary paper feed inhibiting lever 128 is secured to the optics lock-out lever 156, and they pivot about pin 131 as a unit.

Operation of the lock-out system will now be illustrated by reference to FIG. 7. When the document feeder 30 is in its inoperative position off the platen 23 the cam 176 and linkage 164 are arranged as shown in phantom. The linkage 164 has been pushed downwardly by the cam surface 178, thereby pivoting the pivoting plate 158 clockwise and causing the scan lock-out lever 156 to be raised off the optics scan pulley pin 154. In this position, the lock-out lever 156 is inoperative so that conventional scanning operation can take place. Since the lock-out lever has been raised up, the scan drive disengagement lever 180 is also raised up as shown in phantom so that the drive gear 144 is engaged through the clutch 146 to the shaft 136. When the lock-out lever 156 is in its uppermost position the auxillary paper feed inhibit lever 182 is disengaged from the paper feed clutch 123 and, therefore, paper feeding will be keyed to the operation of the solenoid actuated paper feed inhibiting lever I.

Figure 8:
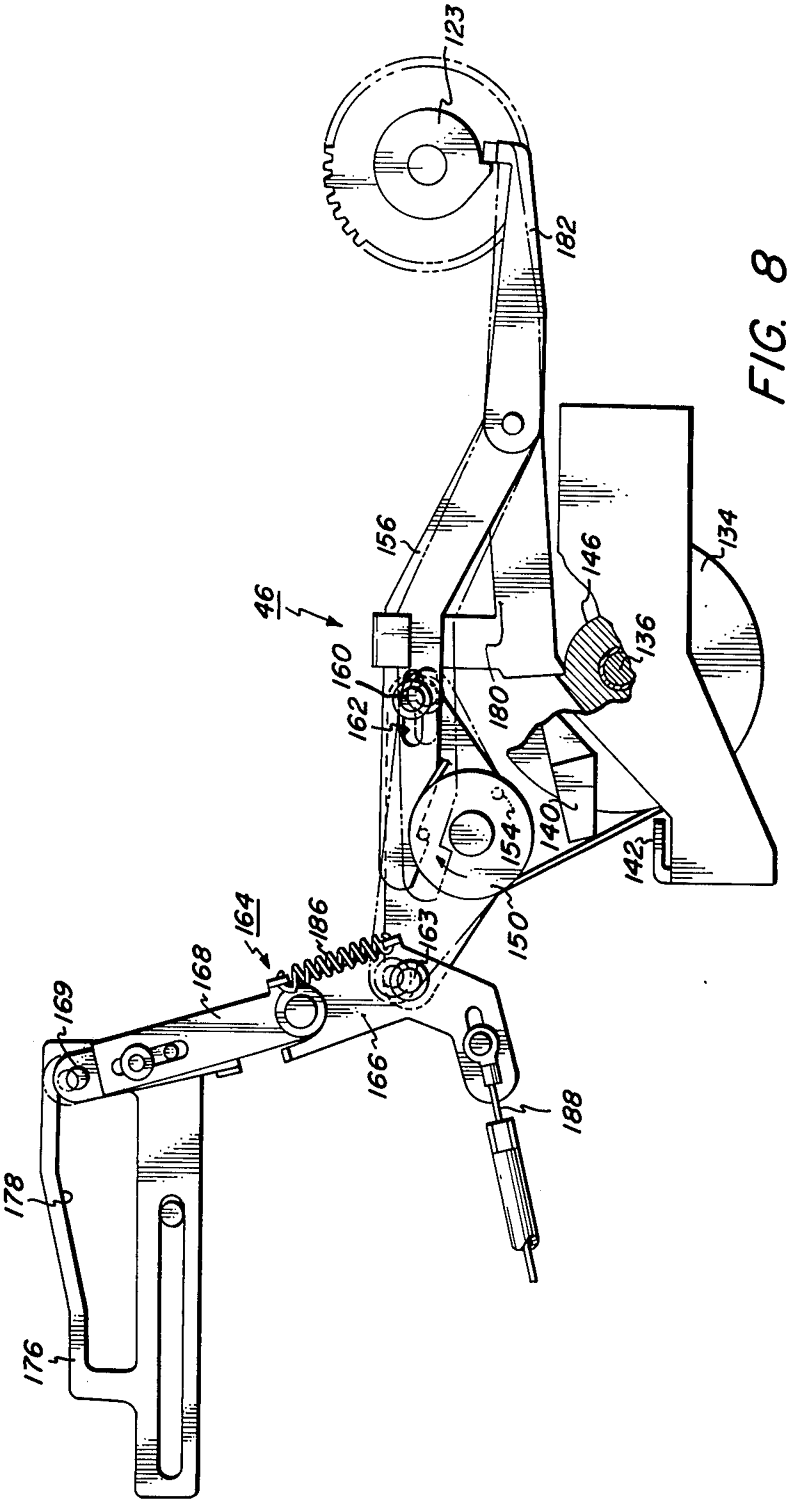
FIG. 8 is a partial front view of the apparatus of FIG. 5 illustrating the operation of the lock out apparatus in conversion to a moving document mode of operation.

Upon movement of the document feeder 30 to its operative position over the platen 23 as shown in FIGS. 1 and 8, the document feeder connecting linkage 164 guided by the pin 169 riding against the cam surface 178 moves upwardly to pivot the pivoting plate 158 in the clockwise direction thereby dropping the lock-out lever 156 to the position shown in phantom. The optics scan pulley 150 will rotate in the direction of the arrow as the mirrors 26 and 27 are driven to their end of scan position. The optical scan pulley 150 actually makes more than one revolution so that the pin 154 engages the lock-out lever 156 on two occasions. The second time the pin 154 engages the lock-out lever 156, the scan pulley 150 stops at the end of scan position as shown in solid lines and is held there by the lock-out lever catching the pin.

The scan drive pulley is disengaged from the drive shaft through the operation of the lip 142 on the scan pawl 140. The detent of clutch 146 is then engaged by the scan drive disengagement lever 180 to disengage the gear from the machine drives.

As the lock-out lever is raised to its locking position as shown in solid lines in FIG. 8, the auxillary paper feed inhibiting lever 182 is disengaged from the paper feed clutch detent so that paper feeding for future copying cycles of the machine may take place in its normal timed sequence using the regular paper feed inhibiting lever 126 and solenoid 125 control.

Figure 4:
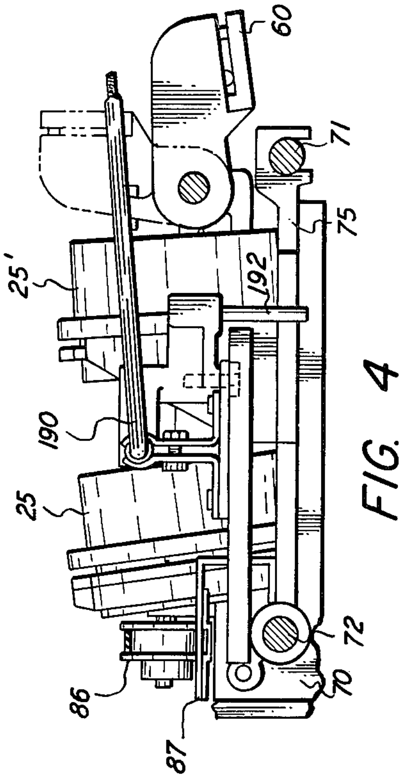
FIG. 4 is a partial side view of the apparatus of FIG. 3.

The lock-out system which has been described is similar in most respects to the one employed in commercially available 3100 LDC machines with the exception that the document feeder connecting linkage 164 is modified to make it collapsable to provide the interlock system 11 of this invention. The pivoting connection between links 166 and 168 allows them to collapse which is a unique feature of the inter-lock system. A spring 186 connected between tabs on the upper and lower links 168 and 164 is arranged to bias the links towards their collapsed state which is shown in solid lines in FIG. 7. A cable 188 is connected between the lower link 166 and a pivoting sensing lever 190 supported by the optics frame 70. When the optical system is in the reduction mode the carriage 75 is in the position shown in phantom in FIG. 3. In this position the action of spring 186 would allow the upper and lower connecting links to be collapsed as shown in FIG. 7. The cable would then pull sensing lever 190 to the position shown in phantom. Referring to FIG. 4 as well, when the optical system is positioned in its base mode the carriage 75 is positioned as shown in solid lines and acts upon pin 192 secured to the sensing lever to pivot it to the position shown in solid lines in FIG. 3, and to thereby pull the cable taught. As the cable is pulled tight, the lower link is pivoted about pin 162 to straighten out the links 166 and 168.

The pivoting sensing lever 190 therefor senses the position of the lens carriage 75, and thereby the position of the mirror carriage 100. In the 1-X mode the mirror carriage is in its lowered position out of the optical ray path. It is important that the add mirror 60 be lowered before the scanning mirrors 26 and 27 are released to fly-back to their start of scan position. Otherwise it is likely as shown in FIG. 1, that the half rate mirror would crash into the add mirror. The use of the collapsing linkage 166 and 168 assures that the scanning mirrors 26 and 27 will not be released prior to the movement of the add mirror 60 to its inoperative position as shown in solid lines. This is the case even if the document feeder 30 is moved off of the platen before the optical system 24 has been conditioned for base mode copying.

Figure 7:
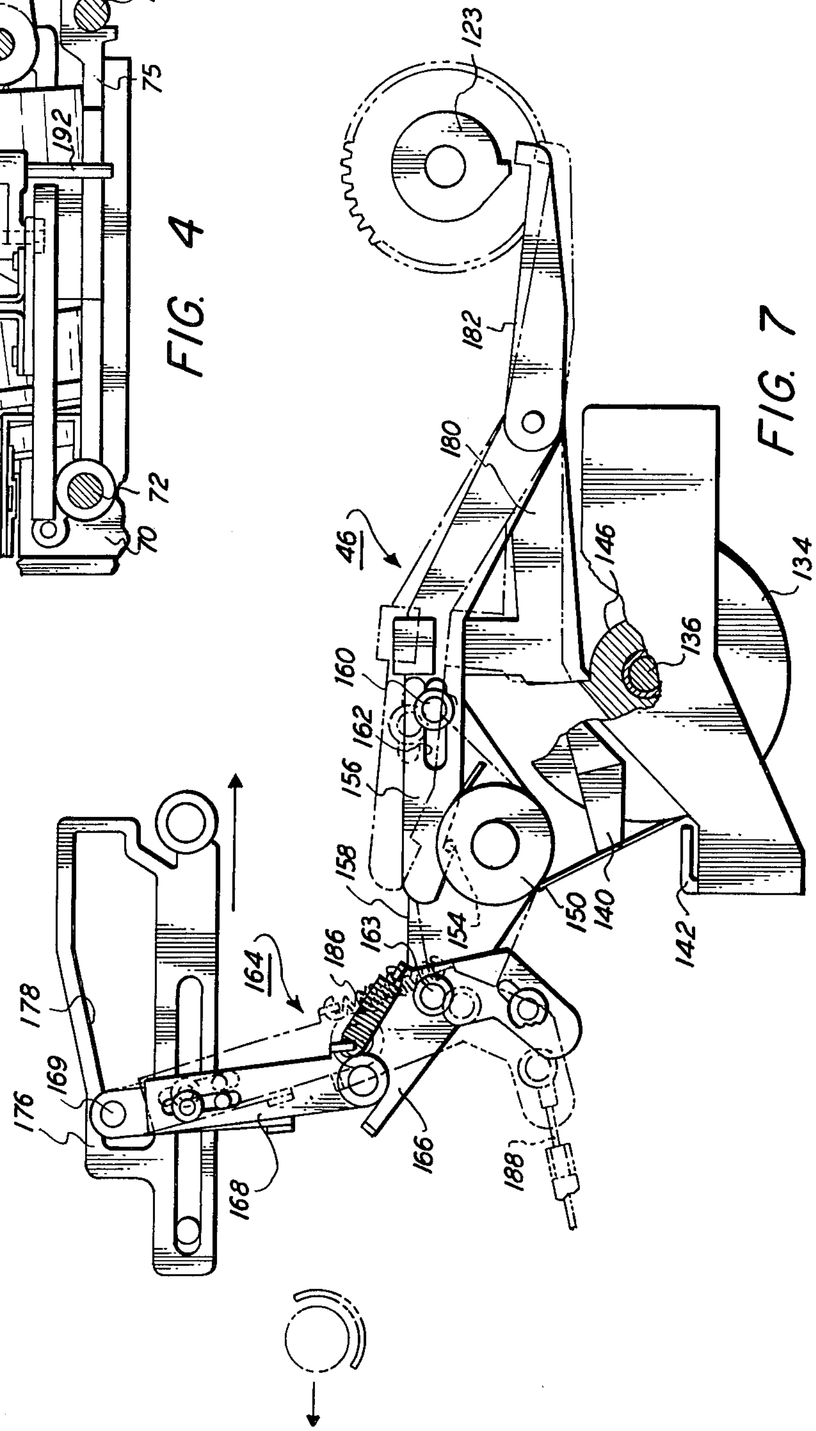
FIG. 7 is a partial front view of the apparatus of FIG. 5 illustrating operation of the interlocking apparatus of the present invention.

Referring to FIG. 7, this operation is illustrated. Lets assume that the document feeder 30 has been prematurely moved off the platen before the optical system 24 was conditioned for base mode copying. Since the optical system is in a reduction mode, the sensing lever 90 is in the position shown in phantom in FIG. 4, and the connecting linkage is collapsed as shown in solid lines in FIG. 7. The result of this is that the pivoting plate 158 and lock-out lever 156 are in their positions shown in solid lines and operate to maintain the scanning mirrors 26 and 27 locked at the end of scan position. As the lens carriage 75 reaches its base mode position, the sensing lever 190 is pivoted to the solid line position shown in FIG. 4 pulling cable 188 taught and thereby straightening out the connecting linkage 164 as shown in phantom in FIG. 7. This causes the pivoting plate 158 to pivot in a counterclockwise direction as shown in phantom and raise the lock-out lever 156 to disengage it from the pin 154 on the scan pulley 150 and, thereby allow the mirrors 26 and 27 to fly-back to their start of scan position.

If the machine 10 had been operated in a moving original mode of exposure other than one requiring reduction, then the linkage 164 would not be collapsed. The linkage is collapsable upon operation of the machine in a reduction mode and movement of the document feeder 30 off of the platen before the optical system has had an opportunity to condition itself back for base mode copying.

In accordance with the present invention, an optics inter-lock system has been provided which is mechanical in nature. Therefore, it is not necessary to provide additional electrical controls for inter-locking the optical system to prevent an improper rearrangement priority of the scanning mirrors.

The lens carriage 75, in accordance with this invention, preferably is translatable in a direction generally transversely of and normal to the optical ray paths.

It is not essential in accordance with the present invention to maintain a common registration edge of the copy sheet for both the base and reduction modes of operation.

In the disclosed optical system changing the conjugate distance effects changes in the projected image magnification according to the following relationship:

$$TC - \left[\frac{f + \frac{f}{m}}{\text{Cos}\ \alpha}\right] + \left[\frac{f + fm}{\text{Cos}\ \alpha}\right]$$

wherein:

| | |
|---|---|
| TC | - Total Conjugate |
| f | - Lens Focal Length |
| m | - Magnification |
| $\frac{f + \frac{f}{m}}{\text{Cos}\ \alpha}$ | - Object Conjugate |
| $\frac{f + fm}{\text{Cos}\ \alpha}$ | - Image Conjugate |
| $\alpha$ | - Angle between optical axis and lens axis |

For purposes of this application the total conjugate is defined as the distance along the principal ray from the object plane of the image plane. The object conjugate is defined as the distance along the principal ray from the object plane to the first nodal point of the lens and the image conjugate is defined as the distance along the principal ray from the image plane to the second nodal point of the lens.

The conjugate changing means in accordance with this invention has been described as being positioned on the object side of the lens, however, it should be apparent that if desired conjugate changing means could be employed on the image side of the lens.

While the invention has been described by reference to embodiments employing two scanning mirrors and a half lens in the optical system any desired optical system adapted to provide moving original exposure could be employed. In the stationary original mode of exposure the scanning need not be carried out by moving mirrors, e.g., a moving lens or other alternatives could be employed. If reflectors are employed in the optical system of this invention, they need not be mirrors since other optical elements of a similar nature could be used. While two lenses have been described in the preferred embodiment, if desired, a single lens which is translatable could be employed as in Hoppner et al. [2].

The patents, patent applications, and texts specifically set forth in this application are intended to be incorporated by reference into the description.

The term electrostatographic as employed in the present application refers to the formation and utilization of electrostatic charge patterns for the purpose of recording and reproducing patterns in viewable form.

It is apparent that there have been provided in accordance with this invention apparatuses which fully satisfy the objects, means and advantages set forth hereinbefore. While the invention has been described in conjunction with specific embodiments therefor, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. In an apparatus including means for viewing a document and for projecting an image thereof onto a moving imaging surface, said viewing means including: a plurality of optical elements arranged along an optical path; means for changing the projected image modification, said magnification changing means including means for changing the positions of at least two of said optical elements so that the projected image magnification is a function of the positions of said at least two optical elements, the improvement wherein:

interlock means associated with said magnification changing means are provided for inhibiting the change in position of one of said at least two optical elements until the other of said at least two optical elements has changed its in position upon changing projected image magnifications.

2. An apparatus as in claim 1, wherein said interlock means includes means for sensing that said other of said at least two optical elements has completed its change in position and means responsive to said sensing means for releasing said one of said at least two optical elements so that it can change its position.

3. An apparatus as in claim 2, wherein said interlock means comprises mechanical means and wherein said sensing means includes at least one pivotable lever arranged to sense the position of said other optical element, and wherein said releasing means includes a collapsable linkage, and means connecting said collapsable linkage to said lever, said collapsable linkage being arranged to be in collapsed condition in response to one position of said lever or to not be collapsed in response to the movement of the lever to another position, said collapsable linkage being arranged in said interlocking means such that when said linkage is collapsed said one optical element is inhibited from changing its position, and when said linkage is not collapsed said one optical element is not inhibited from changing its position.

4. An apparatus as in claim 1, wherein said one optical element comprises a first reflector and wherein means are provided for scanning said first reflector in a first mode of operation and for fixing said first reflector at a given position in a second mode of operation, and wherein said other optical element comprises a second reflector and means are provided for moving said second reflector between a first position in said optical path wherein said reflector is operative to change the conjugate relationship of said viewing means for magnification change, and a second position wherein said optical element is inoperative arranged out of said optical path, whereby said interlocking means is effective to prevent release of said fixed scanning reflector prior to the movement of said second optical element to its inoperative position.

5. In a reproducing apparatus including means for forming an image on a sheet of final support material, said image forming means including means for viewing a document and for projecting an image thereof onto a moving imaging surface said viewing means including: a plurality of optical elements arranged along an optical path; means for changing the projected image magnification, said magnification changing means including means for changing the positions of at least two of said optical elements so that the projected image magnification is a function of the positions of said at least two optical elements, the improvement wherein:

interlock means associated with said magnification changing means are provided for inhibiting the change in position of one of said at least two optical elements until the other of said at least two optical elements has changed its in position upon changing projected image magnification.

6. An apparatus as in claim 5, wherein said interlock means includes means for sensing that said other of said at least two optical elements has completed its change in position and means responsive to said sensing means for releasing said one of said at least two optical elements so that it can change its position.

7. An apparatus as in claim 6, wherein said interlock means comprises mechanical means and wherein said sensing means includes at least one pivotable lever arranged to sense the position of said other optical element, and wherein said releasing means includes a collapsable linkage, and means connecting said collapsable linkage to said lever, said collapsable linkage being arranged to be in a collapsed condition in response to one position of said lever or to not be collapsed in response to the movement of the lever to another position, said collapsable linkage being arranged in said interlocking means such that when said linkage is collapsed said one optical element is inhibited from changing its position, and when said linkage is not collapsed said one optical element is not inhibited from changing its position.

8. An apparatus as in claim 5, wherein said one optical element comprises a first reflector and wherein means are provided for scanning said first reflector in a first mode of operation and for fixing said first reflector at a given position in a second mode of operation, and wherein said other optical element comprises a second reflector and means are provided for moving said second reflector between a first position in said optical path wherein said reflector is operative to change the conjugate relationship of said viewing means for magnification change, and a second position wherein said optical element is inoperative arranged out of said optical path, whereby said interlocking means is effective to prevent release of said fixed scanning reflector prior to the movement of said second optical element to its inoperative position.

9. An apparatus as in claim 5, wherein said viewing means comprises a multi-mode viewing means including a first reflector for scanning a document at a speed synchronized to the speed of said imaging surface, said first reflector receiving the image ray from said document and reflecting it, a second scanning reflector arranged to receive the reflected image ray from said first reflector and reflect it toward a lens, said second reflector being arranged to scan at a speed one-half the speed of said first reflector, and an add reflector selectively positionable into the reflected ray path from said second reflector for receiving and reflecting the image ray back to said second reflector for forming a reflection cavity therewith in one mode of operation and out of the ray path in a second mode of operation, means for fixing said first and second reflectors at a given position in said first mode of operation, and means for feeding documents past said fixed reflectors at a speed synchronized to that of said imaging surface in said first mode of operation, said interlock means being operative upon conversion from said first mode to said second mode to inhibit the scanning of said first and second reflectors prior to said add reflector being positioned out of said ray path.

10. An apparatus as in claim 9, wherein said apparatus comprises an electrostatographic reproducing machine wherein said imaging surface comprises a photosensitive surface and wherein said image forming means includes means for charging said surface, whereby exposure to said projected image forms a latent electrostatic image thereon and means for developing said latent image to render it visible and means for transferring said visible image to said sheet of final support material.

* * * * *